US009924495B2

(12) United States Patent
Wang et al.

(10) Patent No.: US 9,924,495 B2
(45) Date of Patent: Mar. 20, 2018

(54) METHODS AND DEVICES FOR TRANSMITTING OR RECEIVING DEVICE-TO-DEVICE (D2D) BROADCAST INFORMATION, AND TRANSMISSION SYSTEM

(71) Applicant: ZTE Corporation, Shenzhen (CN)

(72) Inventors: Wenhuan Wang, Shenzhen (CN); Jin Yang, Shenzhen (CN); Shuanshuan Wu, Shenzhen (CN); Ming Yuan, Shenzhen (CN); Shuanghong Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/114,677

(22) PCT Filed: Aug. 22, 2014

(86) PCT No.: PCT/CN2014/085067
§ 371 (c)(1),
(2) Date: Jul. 27, 2016

(87) PCT Pub. No.: WO2015/109840
PCT Pub. Date: Jul. 30, 2015

(65) Prior Publication Data
US 2016/0353410 A1    Dec. 1, 2016

(30) Foreign Application Priority Data
Jan. 27, 2014 (CN) .......................... 2014 1 0041206

(51) Int. Cl.
*H04W 72/00* (2009.01)
*H04W 72/12* (2009.01)
(Continued)

(52) U.S. Cl.
CPC ......... *H04W 72/005* (2013.01); *H04W 8/005* (2013.01); *H04W 72/1242* (2013.01);
(Continued)

(58) Field of Classification Search
CPC ....... H04W 4/02; H04W 4/22; H04W 72/005; H04W 72/1242; H04W 72/1289;
(Continued)

(56) References Cited

U.S. PATENT DOCUMENTS

2006/0036520 A1* 2/2006 O'Neill .................. G06Q 30/04
705/34
2008/0120129 A1* 5/2008 Seubert .................. G06Q 10/06
705/35
(Continued)

FOREIGN PATENT DOCUMENTS

CN    101388694 A    3/2009
CN    101437291 A    5/2009
(Continued)

OTHER PUBLICATIONS

International Search Report for corresponding application PCT/CN2014/085067 filed on Aug. 22, 2014; dated Dec. 2, 2014.

*Primary Examiner* — Diane Mizrahi
(74) *Attorney, Agent, or Firm* — Cantor Colburn LLP

(57) ABSTRACT

Provided are methods and devices for transmitting or receiving Device-to-Device (D2D) broadcast information, and a transmission system. The method for transmitting the D2D broadcast information includes that: classification information of service information to be transmitted is acquired; control information corresponding to the classification information is acquired, wherein the control information is used for indicating resource scheduling information used during transmission and/or retransmission of the service information; and the service information and the control information are transmitted in a broadcast manner according to a preset rule.

18 Claims, 8 Drawing Sheets

(51) Int. Cl.
*H04W 8/00* (2009.01)
*H04W 76/00* (2018.01)
*H04W 76/02* (2009.01)

(52) U.S. Cl.
CPC ..... *H04W 72/1289* (2013.01); *H04W 76/002* (2013.01); *H04W 76/007* (2013.01); *H04W 76/023* (2013.01)

(58) Field of Classification Search
CPC ............ H04W 76/002; H04W 76/007; H04W 76/023; H04W 8/005
See application file for complete search history.

(56) References Cited

U.S. PATENT DOCUMENTS

2012/0069131 A1* 3/2012 Abelow ............... G06Q 10/067
348/14.01
2014/0140213 A1* 5/2014 Raleigh ............... H04L 67/2804
370/235

FOREIGN PATENT DOCUMENTS

| CN | 101873704 A | 10/2010 |
| CN | 102547871 A | 7/2012 |
| WO | 2014012457 A1 | 1/2014 |

\* cited by examiner

METHODS AND DEVICES FOR TRANSMITTING OR RECEIVING DEVICE-TO-DEVICE (D2D) BROADCAST INFORMATION, AND TRANSMISSION SYSTEM

TECHNICAL FIELD

The present disclosure relates to the field of communication, and in particular to methods and devices for transmitting or receiving D2D broadcast information, and a transmission system.

BACKGROUND

Along with development of mobile communication service and technologies, current service modes of the wireless network become increasingly rich. Among the service modes, short-distance data sharing between users, small-scale social and commercial activities and local specific user-oriented specific services gradually become non-negligible growth points in a wireless platform of the next stage.

A public safety scenario and corresponding requirements in Long-Term Evolution (LTE)-based D2D communication are also proposed in the 3rd Generation Partnership Project (3GPP), and have attracted broad attentions of members of the standard group. Radio emergency and public safety communication will predictably become a hot research direction in the future.

Along with technical discussions of the standard group, applications applied to scenarios of radio emergency and public safety without network coverage are emphatically discussed in conferences, and current discussions about Radio Access Network (RAN) 1 in D2D communication have determined broadcast as a major target in stage R12. No feedback is determined as a baseline condition of broadcast according to priorities in conference discussions. Under such a condition, how to improve broadcast reliability becomes particularly important. For important broadcast messages in a public safety scenario, for example, in a severe environment scenario (such as emergencies of landslide and mine cave-in), the reception of information may be unreliable because users are distributed at different positions. Therefore, reliable reception of important messages is particularly important.

During broadcast communication, particularly D2D broadcast communication, due to the mobility and uncertainty of transmitting equipment and receiving equipment, there still exists the problem of incapability of a part of equipment terminals in reception although a lower-order transmission code rate is adopted.

Retransmission is an effective means for a wireless communication system to improve spectral efficiency, but an existing system is mainly applied in a closed loop environment, and determines whether to retransmit information or not according to an Acknowledgement/Negative Acknowledgement (ACK/NACK) which is fed back. A broadcast message is usually transmitted by adopting a lower code rate to improve performance. However, in D2D communication, both transmitting equipment and receiving equipment are mobile and do not have stable coverage, so that methods purely based on increase of the transmission power, a low code rate and the like have become inapplicable to D2D broadcast, and meanwhile, how to improve D2D broadcast reliability and system throughput in the lack of feedback mechanism has become a design bottleneck.

For the problems in a related technology, there is yet no effective solution.

SUMMARY

For the technical problems that there is yet no effective solution to how to improve broadcast reliability under the condition of no network coverage and the like in the related technology, the embodiments of the present disclosure provide methods and devices for transmitting or receiving D2D broadcast information, and a transmission system, so as to at least solve the problems.

According to one embodiment of the present disclosure, a method for transmitting D2D broadcast information is provided, which may include that: classification information of service information to be transmitted is acquired; control information corresponding to the classification information is acquired, wherein the control information may be used for indicating resource scheduling information during transmission and/or retransmission of the service information; and the service information and the control information are transmitted in a broadcast manner according to a preset rule.

Optionally, the classification information may include: a priority of the service information and/or an importance degree of the service information to be transmitted.

Optionally, the classification information may include: important and emergent information, important and non-emergent information, emergent and unimportant information and non-emergent and unimportant ordinary information.

Optionally, the classification information may be indicated by a bit value of a preset number of bits.

Optionally, the control information may include: first control information for first transmission of the service information; and second control information for retransmission of the service information.

Optionally, the step that the service information and the control information are transmitted in the broadcast manner according to the preset rule may include at least one of that: when the service information is transmitted for the first time, the control information is transmitted; and when the service information is retransmitted, retransmission of the control information is forbidden, or, a part or all of the control information is retransmitted.

Optionally, the step that the classification information of the service information to be transmitted is acquired may include one of that: the classification information is acquired from high-layer signaling; and the classification information is acquired from specified key press information of specified equipment.

Optionally, the step that the control information corresponding to the classification information is acquired may include that: the control information is acquired according to the classification information and a cache size of the service information on the basis of a monitored condition of available idle channels during competition or on the basis of a resource occupation condition during scheduling.

Optionally, the control information may at least include: the number of transmission times of the service information, a transmission indicator used for indicating that the service information is newly transmitted information, retransmitted information or forwarded information, and a resource allocation parameter used for indicating an occupation condition of resources for transmitting the service information, wherein the newly transmitted information may be service information which has yet not been transmitted before the service information is transmitted and is different from the service information.

Optionally, when a service corresponding to the service information is a constant service, the control information may further at least include: resource scheduling information adopted when the constant service is transmitted in multiple transmissions.

Optionally, the control information may further include at least one of: a retransmission mode, a transmission manner for the service information, Modulation and Coding Scheme (MCS) information used for indicating a modulation mode of the service information, a power parameter used for indicating transmission power of the service information, Multiple Input Multiple Output (MIMO) information used for indicating an antenna transmission mode, a fixed mode used for indicating a shift in a time domain or a frequency domain, a resource frequency hopping parameter used for indicating pattern selection and an adaptive parameter used for selecting a corresponding configuration parameter according to the transmission manner.

Optionally, when the service information is retransmitted, if a frequency-domain position occupied by retransmission of the service information is the same as a frequency-domain position occupied by first transmission of the service information, a sub-frame for transmitting the service information may be configured in a time domain as follows:

$p+n \times shift$, where p represents a sub-frame number during the first transmission of the service information; n represents the number of transmission times of the service information; and shift represents a shift, which is a constant.

Optionally, when the service information and the control information are transmitted, a service channel bearing the service information and a control channel bearing the control information may be multiplexed or separated.

According to another embodiment of the present disclosure, a method for receiving D2D broadcast information is provided, which may include that: service information and control information are received from transmitting equipment, wherein the control information may correspond to a classification information of the service information; the service information is analyzed according to the control information corresponding to the classification information, and whether to assist in transmitting the service information or not is judged according to a specified parameter obtained by analyzing the service information and a current state of receiving equipment; and the service information is forwarded under a condition of judging to assist in transmitting the service information.

Optionally, before the step that whether to assist in transmitting the service information or not is judged according to the classification information of the service information and the current state of the receiving equipment, the method may include that: whether the service information is correctly received or not is judged, wherein whether to assist in transmitting the service information or not is judged under a condition that the service information is correctly received.

Optionally, the method may further include that: whether the service information has retransmitted information or not is judged according to the control information under a condition that the service information is wrongly received, and if the service information has retransmitted information, the service information to be transmitted is reserved; the retransmitted information of the service information is received; and the received retransmitted information of the service information and the reserved service information are combined.

Optionally, the current state of the receiving equipment may include at least one of: a power capability of the receiving equipment and a level of the receiving equipment; and/or the specified parameter may include at least one of: the classification information of the service information and resource scheduling information of the service information.

According to another embodiment of the present disclosure, a device for transmitting D2D broadcast information is provided, which may include: a first acquisition module, configured to acquire classification information of service information to be transmitted; a second acquisition module, configured to acquire control information corresponding to the classification information, wherein the control information may be used for indicating resource scheduling information during transmission and/or retransmission of the service information; and a transmission module, configured to transmit the service information and the control information in a broadcast manner according to a preset rule.

According to another embodiment of the present disclosure, a device for receiving D2D broadcast information is provided, which may include: a receiving module, configured to receive service information and control information from transmitting equipment, wherein the control information may be used for indicating resource scheduling information during transmission and/or retransmission of the service information, and the control information may correspond to classification information of the service information; an analysis module, configured to analyze the service information according to the control information corresponding to the classification information; a judgment module, configured to judge whether to assist in transmitting the service information or not according to a specified parameter obtained by analyzing the service information and a current state of receiving equipment; and a forwarding module, configured to forward the service information under a condition that the judgment module judges to assist in transmitting the service information.

According to another embodiment of the present disclosure, a transmission system for D2D broadcast information is provided, which may include a transmitting device and a receiving device, wherein the transmitting device is any abovementioned device for transmitting the D2D broadcast information and the receiving device is any abovementioned device for receiving the D2D broadcast information.

According to the embodiments of the present disclosure, the technical means of acquiring the corresponding control information according to the classification information of the service information to be transmitted and broadcasting the control information and the service information according to the preset rule is adopted, so that the technical problems that there is yet no effective solution to how to improve broadcast reliability under the condition of no network coverage and the like in the related technology are solved, broadcast reliability is further improved, and system throughput is further improved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflict.

Since transmitting equipment and receiving equipment in D2D broadcast communication have certain mobility and do not have stable network coverage and there is no feedback mechanism, there exists a certain reliability problem in D2D broadcast, and system throughput is also influenced. In order to solve the problem, corresponding solutions are provided by the following embodiments, specifically as follows.

Figure 1:
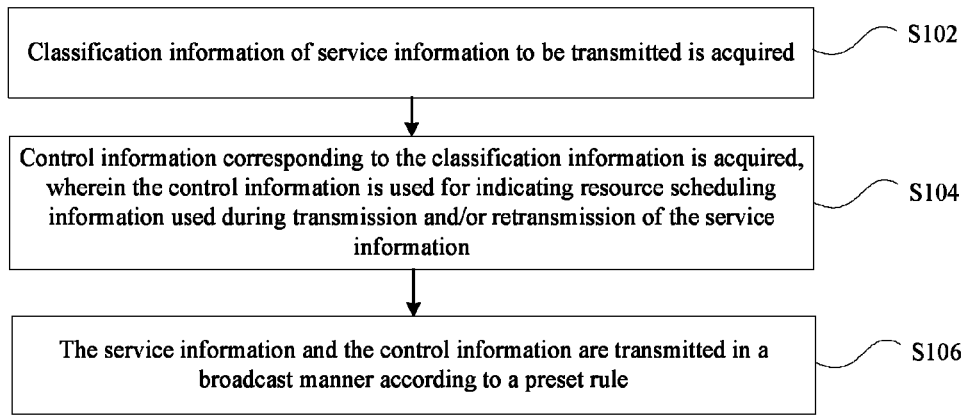
FIG. 1 is a flowchart of a method for transmitting D2D broadcast information according to an embodiment of the present disclosure.

FIG. 1 is a flowchart of a method for transmitting D2D broadcast information according to an embodiment of the present disclosure. As shown in FIG. 1, the method includes Step S102 to Step S106:

Step S102: classification information of service information to be transmitted is acquired;

Step S104: control information corresponding to the classification information is acquired, wherein the control information is used for indicating resource scheduling information used during transmission and/or retransmission of the service information; and Step S106: the service information and the control information are transmitted in a broadcast manner according to a preset rule.

By each of the abovementioned processing steps, before the service information and the control information are transmitted in the broadcast manner, the control information of the service information is acquired according to the classification information of the service information (that is, transmission or retransmission of the service information is preconfigured), so that D2D communication reliability can be improved.

It is important to note that the service information may be pre-classified to determine the classification information of different service information before Step S102, there are multiple classification manners for the service information. For example, the service information may be classified into: important and emergent information, important and non-emergent information, emergent and unimportant information and non-emergent and unimportant ordinary information, according to a priority of the service information and/or an importance degree of the service information to be transmitted. Of course, the technical solution of the embodiment is not limited to the abovementioned classification manner.

In the embodiment, the classification information is indicated by a bit value of a preset number of bits. For example, if 1 bit is adopted for classification, service information with a bit value of 0 is determined as a first type, and service information with a value of 1 is determined as a second type. Of course, the number of bits may also be 2, 3 and the like, and is specifically determined according to a practical condition.

In the embodiment, the control information includes: first control information for first transmission of the service information; and second control information for retransmission of the service information. That is, when the service information is transmitted, the service information may be transmitted for the first time or retransmitted according to the control information.

The preset rule may include at least one of that: when the service information is transmitted for the first time, the control information is transmitted; and when the service information is retransmitted, retransmission of the control information is forbidden, or, a part or all of the control information is retransmitted. That is, the control information may be transmitted to receiving equipment when the service information is transmitted for the first time, and may also be transmitted during retransmission of the service information (a part or all of the control information may be transmitted).

There are multiple acquisition manners for the classification information. For example, the classification information may be preconfigured at a transmitter; the classification information may also be acquired from high-layer signaling, for example, Media Access Control (MAC) information; and the classification information may also be acquired from specified key press information (which may be combined key press information) of specified equipment.

There are multiple acquisition manners for the control information. In a preferred implementation mode of the embodiment, a resource scheduling parameter may be determined according to the classification information and a cache size of the service information on the basis of a monitored condition of available idle channels during competition or on the basis of a resource occupation condition during scheduling.

In the embodiment, the control information may at least include the following information: the number of transmission times of the service information, a transmission indicator used for indicating that the service information is newly transmitted information, retransmitted information or forwarded information, and a resource allocation parameter used for indicating an occupation condition of resources for transmitting the service information, wherein the newly transmitted information is service information which has yet not been transmitted before the service information is transmitted and is different from the service information.

When a service corresponding to the service information is a constant service, the control information may further include at least: resource scheduling information adopted when the constant service is transmitted in multiple transmissions, wherein the resource scheduling information includes: a constant or semi-constant scheduling period and/or resource specification information, or multiple resource allocation information for a large data packet, or first transmission information in other scheduling modes. It is important to note that the abovementioned control information may be control information for first transmission of the service information, i.e. the first control information.

Optionally, the following information is determined as optional information of the control information, that is, the control information (the control information here may be the second control information) may include at least one of: a retransmission mode, a transmission manner for the service information, MCS information used for indicating a modulation mode of the service information, a power parameter used for indicating transmission power of the service information, MIMO information used for indicating an antenna transmission mode, a fixed mode used for indicating a shift in a time domain or a frequency domain, a resource frequency hopping parameter used for indicating pattern selection and an adaptive parameter used for selecting a corresponding configuration parameter according to the transmission manner.

When the service information is retransmitted, if a frequency-domain position occupied by retransmission of the service information is the same as a frequency-domain position occupied by first transmission of the service information, a sub-frame for transmitting the service information may be configured in a time domain as follows:

p+n×shift, where p represents a sub-frame number during the first transmission of the service information; n represents the number of transmission times of the service information; and shift represents a shift, which is a constant.

When the service information and the control information are transmitted, a service channel bearing the service information and a control channel bearing the control information may be multiplexed or separated. That is, the service channel and the control channel may be multiplexed, and may also be independent of each other.

Figure 2:
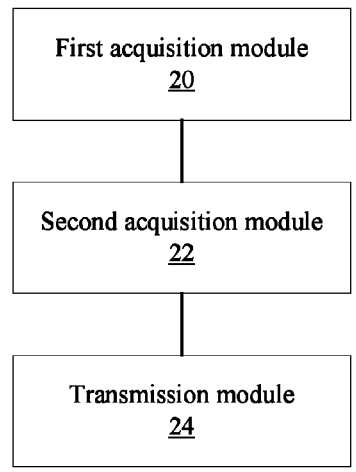
FIG. 2 is a structure diagram of a device for transmitting D2D broadcast information according to an embodiment of the present disclosure.

In the embodiment, in order to implement the method, the embodiment further provides a device for transmitting D2D broadcast information, and as shown in FIG. 2, the device may include:

a first acquisition module 20, configured to acquire classification information of service information to be transmitted;

a second acquisition module 22, coupled with the first acquisition module 20 and configured to acquire control information corresponding to the classification information, wherein the control information is used for indicating resource scheduling information used during transmission and/or retransmission of the service information; and a transmission module 24, coupled with the second acquisition module 22 and configured to transmit the service information and the control information in a broadcast manner according to a preset rule.

Figure 3:
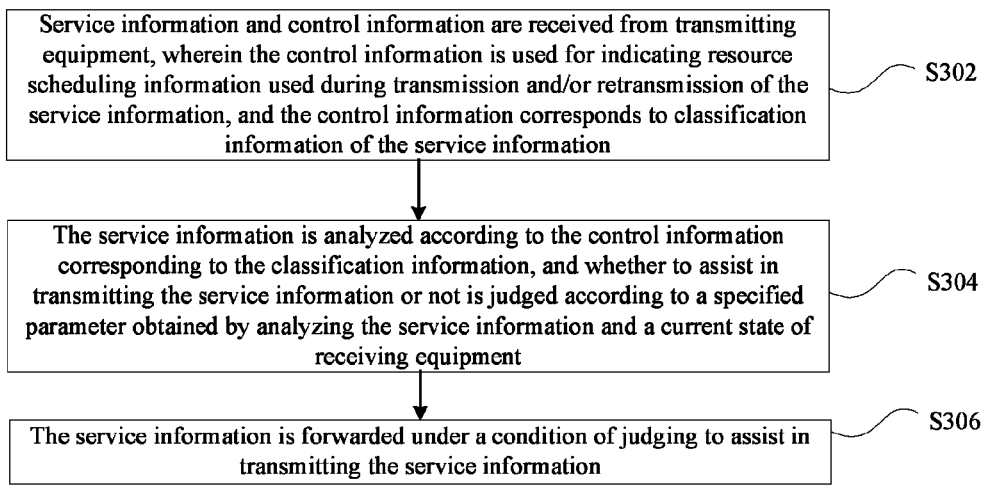
FIG. 3 is a flowchart of a method for receiving D2D broadcast information according to an embodiment of the present disclosure.

Descriptions will be given below from receiving side equipment. FIG. 3 is a flowchart of a method for receiving D2D broadcast information according to an embodiment of the present disclosure. As shown in FIG. 3, the method may include Step S302 to Step S306:

Step S302: service information and control information are received from transmitting equipment, wherein the control information is used for indicating resource scheduling information used during transmission and/or retransmission of the service information, and the control information corresponds to classification information of the service information;

Step S304: the service information is analyzed according to the control information corresponding to the classification information, and whether to assist in transmitting the service information or not is judged according to a specified parameter obtained by analyzing the service information and a current state of receiving equipment; and Step S306: the service information is forwarded under a condition of judging to assist in transmitting the service information.

In Step S304, before whether to assist in transmitting the service information or not is judged, whether the service information is correctly received or not is judged (for example, the received service information is checked and whether the service information is checked to be correct or not is judged), wherein whether to assist in transmitting the service information or not is judged under a condition that the service information is correctly received.

Under the condition that the service information is wrongly received, whether the service information has retransmitted information or not is judged according to the control information, and if the service information has retransmitted information, the service information to be transmitted is reserved; the retransmitted information of the service information is received; and the received retransmitted information of the service information and the reserved service information are combined.

The current state may include at least one of: a power capability of the receiving equipment and a level of the receiving equipment; and/or the specified parameter may include at least one of: the classification information of the service information and resource scheduling information of the service information.

Figure 4:
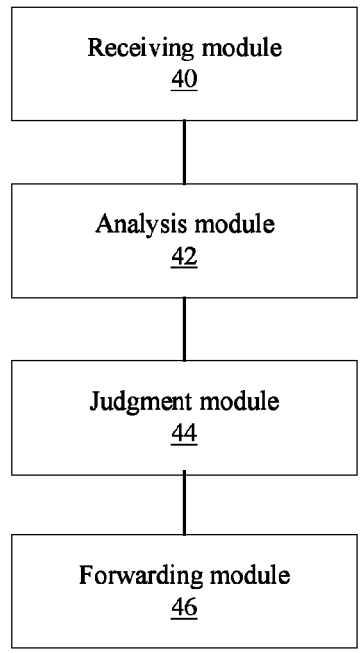
FIG. 4 is a structure diagram of a device for receiving D2D broadcast information according to an embodiment of the present disclosure.

In the embodiment, a device for receiving D2D broadcast information is further provided, which is configured to implement the abovementioned receiving method. As shown in FIG. 4, the device may include:

a receiving module 40, configured to receive service information and control information from transmitting equipment, wherein the control information corresponds to classification information of the service information;

an analysis module 42, coupled with the receiving module 40 and configured to analyze the service information according to the control information corresponding to the classification information;

a judgment module 44, coupled with the analysis module 42 and configured to judge whether to assist in transmitting the service information or not according to a specified parameter obtained by analyzing the service information and a current state of receiving equipment; and a forwarding module 46, coupled with the judgment module 44 and configured to forward the service information under a condition that the judgment module 44 judges to assist in transmitting the service information.

In the embodiment, a transmission system for D2D broadcast information is further provided, which includes a transmitting device and a receiving device, wherein the transmitting device is any abovementioned device for transmitting the D2D broadcast information and the receiving device is any abovementioned device for receiving the D2D broadcast information.

In order to better understand the abovementioned embodiments, detailed descriptions will be given below with reference to preferred embodiments.

Embodiment 1

1) Classification of Transmitted Information

Broadcast information may include massive information with different contents, and information to be transmitted is divided into important and emergent information, important and non-emergent information, emergent and unimportant information, non-emergent and unimportant information and the like according to different information and information contents.

The important and emergent information is usually emergency evacuation and serious information warning such as cave-in early warning and new disaster situation early warning, a sudden fire in a commercial district and emergency rescue;

the important and non-emergent information is usually development of a green channel, a disaster rescue progress and the like;

the emergent and unimportant information is message notification in emergencies and the like; and the non-emergent and unimportant information is commercial broadcast advertising within coverage, and has extensive contents.

The information may be transmitted through a high layer and obtained by analyzing high-layer signaling, and may also be directly generated in a physical layer through a special setting of special equipment (for example, a mobile phone), wherein the special setting refers to a special function key or functions of emergency call on the special equipment.

The above is only description with one kind of classification as an example, and other classification manners may also be adopted.

2) Pre-Scheduling of the Transmitted Information

Transmitting equipment obtains a type of information to be transmitted (which may be service information) by analyzing high-layer signaling or through special equipment, and performs pre-scheduling on the basis of information such as a channel occupation condition monitored during competition or a resource occupation condition read during scheduling, a cache size of first-level information to be transmitted, i.e. a length of a transmitted content, a pre-scheduled content including transmission times of the information, a retransmission interval between first transmission and retransmission, a retransmission method for each time (including, but not limited to, a retransmission mode) and a retransmission configuration (a fixed resource manner, a fixed resource frequency hopping manner, adaptive transmission and the like), wherein the retransmission method for each time may include Chase Combining/Incremental Redundancy (CC/IR) combining transmission, a modulation manner, a resource requirement, power configuration and the like.

A control information content for first transmission may be a combination of multiple pieces of information, that is, there may not be MCS information in a fixed debugging manner negotiated by two parties; and there may not be MIMO information during transmission of the equipment with a single antenna, and there may not be a power message when the equipment configures broadcast transmission power.

A minimum control information set may include the number of retransmission times (i.e. the number of transmission times), a transmission indicator of newly transmitted information, and a resource allocation parameter for new transmission, as shown in Table 1.

The resource allocation parameter for new transmission refers to a first address of the newly transmitted information, may be a resource sequence number, and may also be a sequence number of a broadcast channel, that is, a resource occupation condition of the broadcast channel in a frame structure may be clearly obtained.

The resource allocation parameter for new transmission may be a first address during constant scheduling or semi-constant scheduling and an allocated content for periodic scheduling, such as a Voice over Internet Protocol (VoIP) service.

The resource allocation parameter for new transmission may be a first address of a large data packet or content of multiple resource allocations.

At this moment, information such as MCS information, MIMO information, a power parameter and a retransmission mode (which may be indicated to be a CC mode) is information known by receiving equipment, and and the retransmitted information may be calculated according to an agreement, that is, a retransmitted resource obtains a fixed shift according to the number of retransmission times in a fixed format or a manner that the two parties know or through another message.

TABLE 1

| Information | Description |
| --- | --- |
| Number of transmission times | N, N being a natural number |
| Transmission indicator | Indicating new transmission and retransmission or forwarding |
| Resource allocation parameter | Indicating resource occupation for service transmission |

Retransmission configuration negotiation may include: 1) a frequency position occupied by a resource for first transmission is the same as a frequency position occupied by a resource for retransmission, and for a time-domain sub-frame (first transmission)+n*shift1, n=1 during first retransmission, n=2 during second retransmission and n=N−1 during (N−1)th retransmission. A first transmission resource and retransmission resources are occupied on the time domain and the frequency domain according to a certain rule, i.e. the first transmission time-domain sub-frame+n*shift1 and a frequency-domain Physical Resource Block (PRB)+n*shift2, n=1 during first retransmission, n=2 during second retransmission and n=N−1 during (N−1)th retransmission, wherein shift is a shift known by both parties or obtained in another manner.

The control information set may include the number of retransmission times (i.e. the number of transmission times), the retransmission indicator for new retransmission, the resource allocation parameter for new transmission, the MIMO information, the MCS information, power information (i.e. the power parameter), the retransmission mode, a transmission sub-frame interval, the transmission manner and a transmission-manner-based parameter configuration, and the information may certainly be clipped under the condition of a part of known information or system function configuration, specifically as shown in Table 2.

TABLE 2

| Information | Description | Information | Description |
|---|---|---|---|
| Number of transmission times | N | Retransmission mode | CC, IR and the like |
| Transmission indicator | Indicating new transmission and retransmission or forwarding | Time interval | Sub-frame number corresponding to the number of retransmission times |
| Resource allocation parameter | Indicating resource occupation for service transmission | Transmission manner | 0: fixed, 2: frequency hopping, and 3: adaptive |
| MCS information | Indicating a modulation and coding mode for service transmission | Fixed mode | Time-domain and frequency-domain shift |
| Power parameter | Indicating transmission of a power related parameter | Resource frequency hopping parameter | Marking pattern selection |
| MIMO information | Indicating a multi-antenna transmission mode | Adaptive parameter | Resource indication, MCS, power, MIMO information and the like |

The fixed mode is used for indicating time-domain and frequency-domain transmission shifts.

The fixed resource frequency hopping parameter is at least used for indicating first resource occupation and known-manner-based retransmission, and both parties may also transmit hopping patterns according to sequence numbers according to a few known mode hopping solutions.

The adaptive parameter is that a transmission characteristic of each transmission is configured in a predefined manner, that is, the parameters such as modulation manners for first transmission and each retransmission, resource configuration and power configuration are predefined, the adaptive parameter for each time may be configured according to a scheduling solution and a requirement, that is, power parameter adaptation, resource adaptation, scheduling manner adaptation and the like may be adopted, and adaptation of a combination of one or more parameters may also be adopted.

3) Cooperative Transmission

Cooperative transmission refers to that receiving equipment which receives correctly (received information passes verification of the receiving equipment) may cooperate for cooperative transmission on a resource scheduled for retransmission if a CC transmission mode is adopted for retransmission, and control information may also be cooperatively transmitted except that broadcast service information is cooperatively transmitted on a specified resource according to control information for first transmission and a specified mode, wherein a cooperatively transmitted content may include the received information (including all decoded information which is received), and cooperative transmission is implemented on a corresponding resource according to a pre-scheduling indication.

Based on the above description, the embodiment provides a solution for D2D information transmission at a transmitter, specifically as follows:

for transmitting equipment:

an information type is obtained by MAC or special terminal keying.

An information classification module: performs indication by virtue of 1~3 bit information according to an information classification level.

TABLE 3

| | 1 bit Indication |
|---|---|
| 0 | Unimportant and non-emergent information |
| 1 | Important and emergent information |

TABLE 4

| | 2 bit Indication |
|---|---|
| 00 | Unimportant and non-emergent |
| 10 | Emergent and unimportant |
| 01 | Important and non-emergent |
| 11 | Important and emergent information |

TABLE 5

| | 3 bit Indication |
|---|---|
| 000 | Non-emergent and unimportant information |
| 001 | Reserved |
| 010 | Emergent and unimportant information |
| 011 | Reserved |
| 100 | Important and non-emergent information |
| 101 | Reserved |
| 110 | Reserved |
| 111 | Important and emergent information |

Table 3-5 only mark information classification, wherein "reserved" is a more detailed function extension of a system.

An information type indicator may be specified by the high layer, and may also be set by special equipment through a shortcut key.

Information classification is implemented only in two dimensions of importance and emergency, and another classification method may also be adopted.

A predefinition module is configured for resource pre-scheduling. Scheduling is performed according to an information classification result, an idle resource condition and a parameter such as a size of data to be transmitted, and an information content of a control channel is determined, such as transmission times, a debugging manner, a transmission mode and transmission power.

The transmitting equipment in the embodiment is configured to transmit a broadcast message, wherein the broadcast message may include broadcast control information and broadcast service information.

A competition-based manner and a scheduling-based manner may be supported according to a specific implementation process.

For a broadcast control channel bearing the broadcast control information and a broadcast service channel bearing the broadcast service information, a manner that the broadcast control channel and the broadcast service channel are separated is supported, and a manner that the broadcast control channel and the broadcast service channel are multiplexed is also supported.

The control channel bears scheduling information, wherein control signaling may include: control information required to indicate first transmission and retransmission of the equipment, such as a resource allocation parameter, MCS information, power information, MIMO information, the number of data packet retransmission times, a time interval, a retransmission mode and a resource allocation parameter for retransmission, specifically as shown in Table 6.

In order to simplify the information content, the MCS information may also adopt a fixed mode, i.e. a manner that two parties know, or the MCS information is bound with the information type.

For single-antenna equipment, there may be no MIMO information.

In order to balance transmission power, a fixed power manner may be adopted, that is, power known by two parties is adopted for transmission.

If a known retransmission mode is adopted, a fixed retransmission shift is adopted (for example, a retransmission manner negotiated by two parties is adopted), that is, the retransmission manner is determined, and only the transmission times is required to be known to acquire the retransmission information.

Therefore, a minimum content transmitted by the control channel may be parameters shown in Table 7.

TABLE 6

| Information | Description | Information | Description |
| --- | --- | --- | --- |
| Number of transmission times | N | Retransmission mode | CC, IR and the like |
| Transmission indicator | Indicating new transmission and retransmission or forwarding | Time interval | Sub-frame number corresponding to the number of retransmission times |
| Resource allocation parameter | Indicating resource occupation for service transmission (including a resource indication of a constant service) | Transmission manner | 0: fixed and 1: adaptive |
| MCS | Indicating a modulation and coding mode for service transmission | Fixed mode | Time-domain and frequency-domain shift |
| Power parameter | Indicating transmission of a power related parameter | Resource frequency hopping parameter | Marking pattern selection |
| MIMO information | Indicating a multi-antenna transmission mode | Adaptive parameter | Resource indication, MCS, power, MIMO information and the like |

The control information in Table 6 is selected according to scheduling, and may be added and deleted, and all new transmission and retransmission information is transmitted in a control channel during first transmission, wherein the resource allocation parameter, the MCS information, the power parameter and the MIMO information are first transmission information, the other information is retransmission information, the retransmission information may be the same set of retransmission control information according to the number of transmission times, and different retransmission control information may also be transmitted according to scheduling every time. The transmitting equipment forms a transmission packet according to whether the control channel and the broadcast service channel adopt a separate mode or a multiplexed mode or not, transmits the packet according to a flow, and transmits the packet on a predefined retransmission resource in a predefined manner according to retransmission scheduling.

TABLE 7

| Information | Description |
| --- | --- |
| Number of transmission times | N |
| Transmission indicator | 0 (new transmission) |
| Resource allocation parameter | Indicating resource occupation for service transmission |

Only broadcast service data may be transmitted during retransmission, and a control channel may also be reformed according to a retransmission format, that is, the broadcast service data and broadcast control data may be transmitted at the same time. At this moment, the control information is shown in Table 8.

TABLE 8

| Information | Description | |
|---|---|---|
| Number of transmission times | N − 1 | |
| Transmission indicator | 1 (retransmission) | 5 |
| Resource allocation parameter | Indicating resource occupation for service transmission | |

A control information content which may be clipped according to a requirement is shown in Table 9:

TABLE 9

| Information | Description | Information | Description |
|---|---|---|---|
| Number of transmission times | N | Retransmission mode | CC, IR and the like |
| Transmission indicator | Indicating new transmission and retransmission or forwarding | Time interval | Sub-frame number corresponding to the number of retransmission times |
| Resource allocation parameter | Indicating resource occupation for service transmission (including a resource indication of a constant service) | Transmission manner | 0: fixed, 2: frequency hopping and 3: adaptive |
| MCS information | Indicating a modulation and coding mode for service transmission | Fixed mode (selected according to the transmission manner) | Time-domain and frequency-domain shift |
| Power parameter | Indicating transmission of a power related parameter | Resource frequency hopping parameter (selected according to the transmission manner) | Marking pattern selection |
| MIMO information | Indicating a multi-antenna transmission mode | Adaptive parameter (selected according to the transmission manner) | Resource indication, MCS, power, MIMO information and the like |

Only the broadcast service data may be transmitted during retransmission, and the control channel may also be reformed according to the retransmission format, as shown in Table 10.

TABLE 10

| Information | Description | Information | Description |
|---|---|---|---|
| Number of transmission times | N − 1 | Retransmission mode | CC, IR and the like |
| Transmission indicator | Retransmission | Time interval | Sub-frame number corresponding to the number of retransmission times |
| | | Transmission manner | 0: fixed, 2: frequency hopping and 3: adaptive |
| | | Adaptive parameter (a configuration parameter is selected according to a manner) | Fixed mode includes time-domain and frequency-domain shift Frequency hopping manner includes a frequency hopping pattern Adaptive manner includes resource indication, MCS, power, MIMO information and the like |

Receiver Equipment:

the receiving equipment is configured to receive the broadcast control channel, perform decoding, receive and decode the broadcast service channel according to the decoded control information and forward the service channel according to an equipment capability and a control channel information requirement.

The receiving equipment consists of multiple pieces of equipment distributed at different positions in a receiving group, including multiple modules such as a decoder, a scheduler, a buffer and a combiner.

For Correctly Receiving Equipment:

the decoder acquires the control channel transmitted by the transmitting equipment, obtains information of the service channel and decodes the service channel according to a description of the control channel, and the equipment judges whether to assist in transmission or not if the service channel is correctly decoded, the information is retransmitted information and it is necessary to perform judgment according to an equipment capability such as a power capability, a User Equipment (UE) level, a service attribute to be forwarded and another parameter of the scheduler, loads the received information into the buffer for waiting for transmission if determining to assist in transmission, otherwise reads the information and then discards the received packet.

If the CC mode is adopted, the equipment determines to assist in transmission and there are three choices: 1, the service data is transmitted according to a retransmission requirement of the received control information, and the received broadcast information is transmitted on the pre-defined resource for retransmission according to the received control channel information; 2, the control channel is formed for transmission on a negotiated control channel according to the received retransmission information by monitoring a competition process (similar to a process of first transmitting equipment (i.e. equipment which transmits the newly transmitted service information for the first time in the transmitting equipment)), or on the basis of the scheduling manner when a competition-based scheduling mechanism is adopted, and the service channel is transmitted according to the received predefined resource for retransmission; and 3, the control channel is formed for transmission on the negotiated control channel and service channel according to the retransmission information by monitoring the competition process (similar to the process of the first transmitting equipment), or on the basis of the scheduling manner when the competition-based scheduling mechanism is adopted, and the service channel is transmitted according to a negotiation competition result of the equipment. Contents of the control channel at least include the following contents wherein the resource allocation parameter may be the same as that when the retransmission manner specified by first transmission according to the scheduling manner, and may also be different. At this moment, the control information is shown in Table 11.

TABLE 11

| Information | Description |
| --- | --- |
| Number of transmission times | N − 1 |
| Transmission indicator | 2 (cooperative transmission) |
| Resource allocation parameter | Indicating resource occupation for service transmission |

If the IR mode is adopted, a cooperation manner only adopts the third manner, that is, the control channel is formed for transmission on the negotiated control channel and service channel according to the retransmission information by monitoring the competition process (similar to the process of the first transmitting equipment), or on the basis of the scheduling manner when the competition-based scheduling mechanism is adopted, and the service channel is transmitted according to a negotiation competition result of the equipment. The contents of the control channel at least include contents shown in Table 12.

TABLE 12

| Information | Description |
| --- | --- |
| Number of transmission times | N − 1 |
| Transmission indicator | 2 (cooperative transmission) |
| Resource allocation parameter | Indicating resource occupation for service transmission |
| Transmission mode | IR |

It is important to note that the cooperative equipment only cooperate under the condition of correct first reception.

Wrongly Receiving Equipment:

if the CC mode is adopted, in case of wrong reception, whether the information has retransmitted information or not is checked according to the decoded control channel information, and if the information has the retransmitted information, the information is reserved, the retransmitted information is received at a retransmission position indicated by the control channel, and the received retransmitted information and the reserved received information are combined by the combiner and then decoded by the decoder.

By the method of pre-configuring retransmission by the transmitter, the receiver waits for retransmission of the transmitter in case of wrong reception, and then combines the received information, so that receiving reliability is improved.

Embodiment 2

Figure 5:
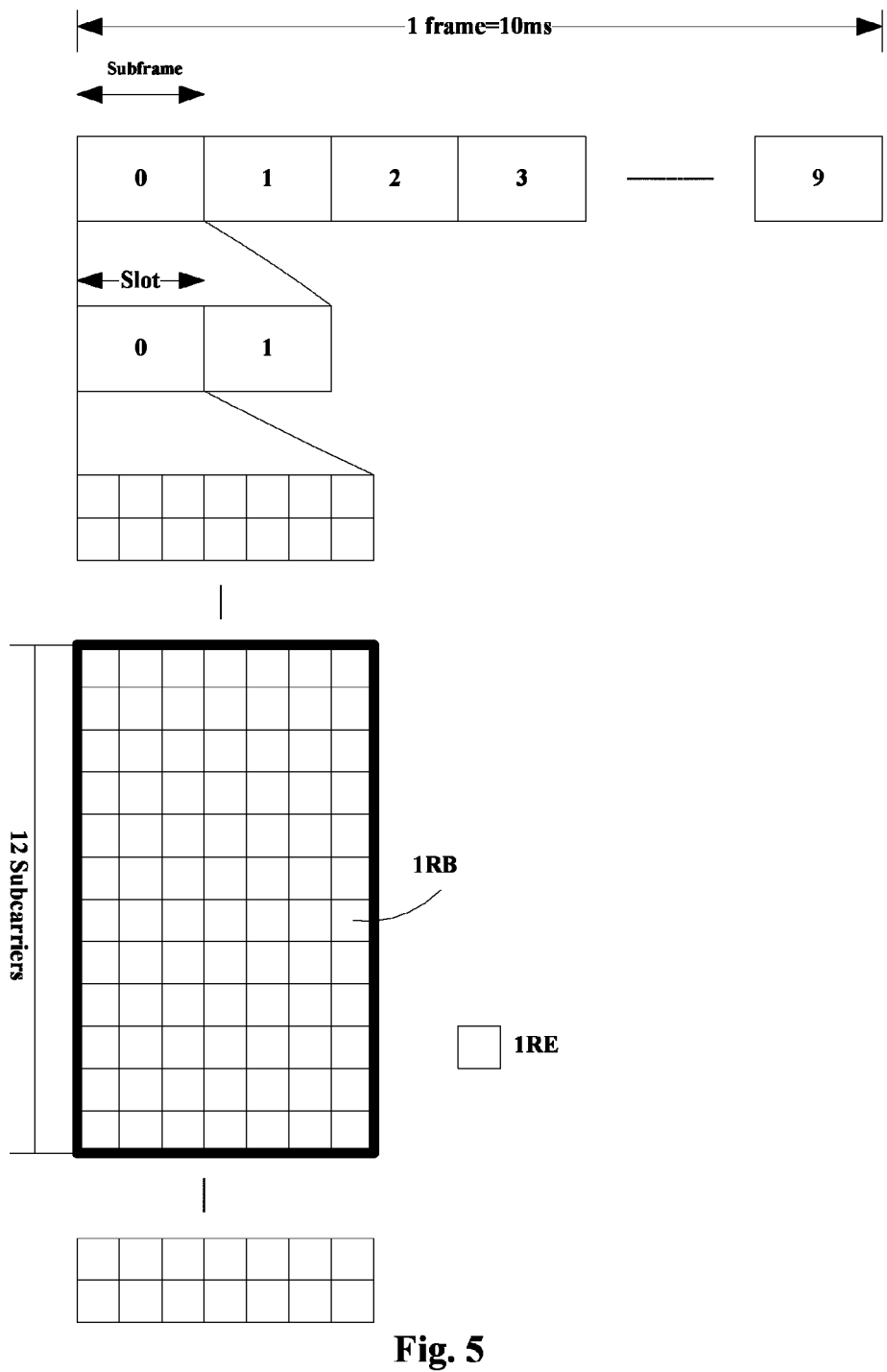
FIG. 5 is a diagram of a frame structure and resource allocation according to an embodiment of the present disclosure.

In an Orthogonal Frequency division Multiple Access/Single-Carrier Frequency Division Multiple Access (OFDMA/SC-FDMA) system, a radio resource configured for communication adopts a time-frequency two-dimensional form. For example, for an LTE/LTE-Advanced (LTE-A) system, communication resources of an uplink and a downlink are divided by taking a radio frame as a unit in a time direction, each radio frame has a length of 10 ms, and includes 10 sub-frames with lengths of 1 ms, and each sub-frame includes two slots with lengths of 0.5 ms, as shown in FIG. 5. According to different Cyclic Prefix (CP) configurations, each slot may include 6 or 7 OFDMA or SC-FDMA symbols.

In a frequency direction, resources are divided by taking a subcarrier as a unit, and specifically, a minimum unit for frequency-domain resource allocation in communication is Resource Block (RB), corresponding to a Physical RB (PRB) of physical resources. A PRB includes 12 subcarriers in the frequency domain, and corresponds to a slot in the time domain. Resources corresponding to a subcarrier on each OFDMA/SC-FDMA symbol are called Resource Elements (REs). Resource indication refers to determining radio resources under combined indication of a time-domain sub-frame and a frequency-domain PRB, as shown in FIG. 1.

Figure 6:
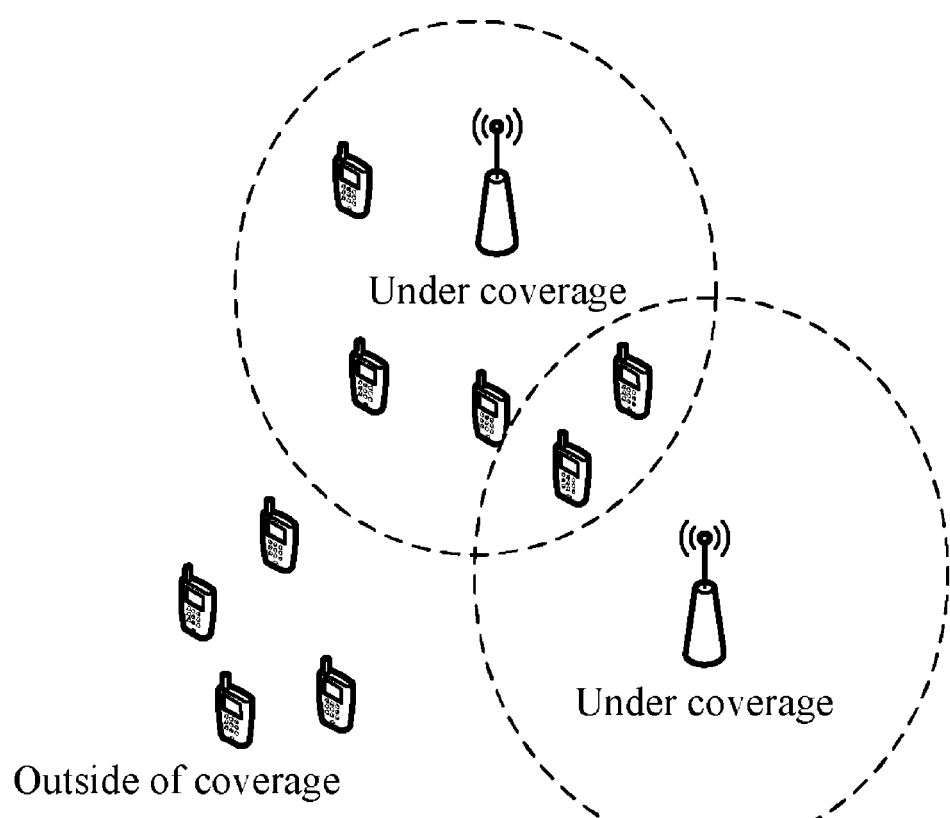
FIG. 6 is a diagram of a D2D working scenario according to an embodiment of the present disclosure.

FIG. 6 shows a few D2D working scenarios, and as shown in FIG. 6, D2D communication may be implemented in an uncovered area, a partially covered area (coverage crossed area) and a totally covered area.

The two manners are adopted for transmission of broadcast information:

a competition-based transmission manner: competition is freely initiated on an idle resource; and a scheduling-based transmission manner: a center node may negotiate about resource scheduling through a request.

Figure 7:
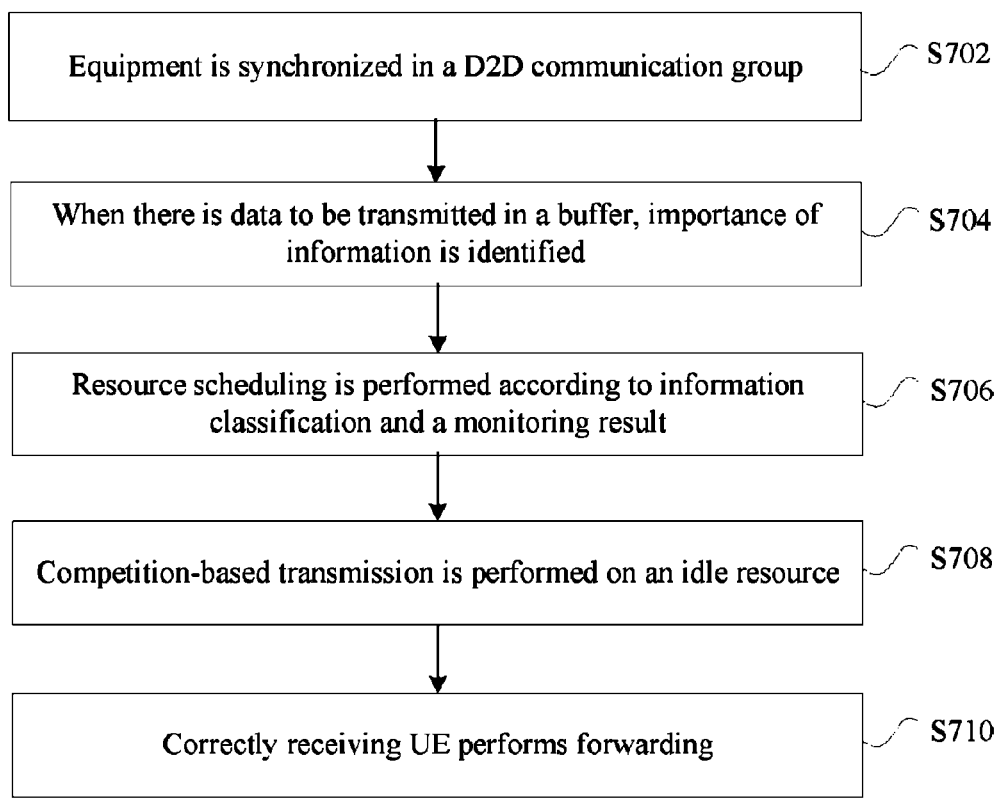
FIG. 7 is a flowchart of competition-based transmission according to an embodiment of the present disclosure.

A competition-based transmission flow is described at first. As shown in FIG. 7, the transmission flow is as follows.

Step S702: equipment is synchronized in a D2D communication group.

Step S704: when there is data to be transmitted in a buffer, importance of the information is identified: classification is performed according to information importance configured by a system (1~3 bit may be adopted for classification), and the information may further be classified into ordinary information, important information and important and timely information.

The equipment performs monitoring to identify an available idle channel by monitoring.

Figure 12:
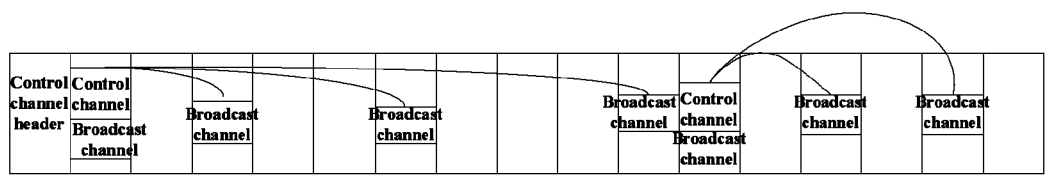
FIG. 12 is a diagram of multiplexing of a control channel and a service channel according to an embodiment of the present disclosure.
Figure 13:
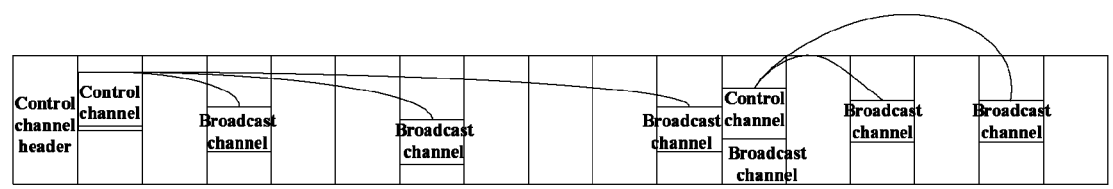
FIG. 13 is a diagram of independence of a control channel and a service channel according to an embodiment of the present disclosure.

Four Manners May be Adopted for a Monitoring Process:

Manner 1: identification of a control channel header for channel occupation, wherein the control channel header forms a fixed binding relationship with a control channel and a broadcast channel, and is used for indicating resource occupation of the control channel and the broadcast channel, the control channel header may be read to monitor resource occupation conditions of the broadcast control channel and the broadcast channel to rapidly monitor resource occupation, as shown in FIG. 12-13, and in the embodiment adopting such a manner, the occupation conditions of the channels are marked in the control channel header, a sub-frame occupation condition is judged, an idle sub-frame is identified, collision reduction resource scheduling input information for a competition condition is transmitted on the idle sub-frame according to a scheduling result, and if the information is not completely transmitted, the resource occupation condition of the remaining broadcast channel is marked in the next control information header;

Manner 2: a manner that there is no control header and broadcast control information and broadcast information are independent according to own channels, as shown in FIG. 4, wherein, in the embodiment adopting such a manner, the broadcast control channel is read to acquire a resource and retransmission resource occupation condition;

Manner 3: a manner that there is no control header and the broadcast information and broadcast control information multiplex one channel, wherein the channel control information is read to acquire the resource and retransmission resource occupation condition; and Manner 4: a blind detection manner, wherein the information is transmitted on an idle resource according to a monitored resource power occupation condition, and such a manner may be implemented by identifying a resource occupation condition of a current frame and then further obtaining a scheduling condition of the other sub-frames according to whether the channels are separated or multiplexed.

Step S706: resource scheduling is performed.

Scheduling is performed according to information classification and a monitoring result, information classification is determined as an important judgment basis for transmission of retransmitted information, MCS information and the like, and the monitoring result is determined as a judgment basis for resource scheduling information, the MCS information and the like.

If the information is ordinary information, an ordinary scheduling result forms a transmission mode 0.

TABLE 13

Control Information of Manner 1

| Information | Description |
| --- | --- |
| Number of transmission times | 1 |
| Transmission indicator | 0 (new transmission) |
| Resource allocation parameter | Indicating resource occupation for service transmission |
| MCS information | Indicating a modulation mode for service transmission |
| Power parameter | Indicating transmission of a power related parameter |
| MIMO information | Indicating a multi-antenna transmission mode | or

TABLE 14

Control Information of Manner 2

| Information | Description |
| --- | --- |
| Number of transmission times | 2 |
| Transmission indicator | 0 (new transmission) |
| Resource allocation parameter | Indicating resource occupation for service transmission |
| MCS information | Indicating a modulation mode for service transmission |
| Power parameter | Indicating transmission of a power related parameter |
| MIMO information | Indicating a multi-antenna transmission mode |

The number of transmission times in Manner 2 is 2, and is used for indicating that equipment 1 and other correctly receiving equipment in the group may perform second transmission on a configuration for first transmission, and equipment 1 and the other correctly receiving equipment have the same forwarding right, that is, equipment 1 may select to transmit or not to transmit. The other correctly receiving equipment may select to transmit or not to transmit, a selection principle is an equipment exertion principle, and the equipment exertion principle means that power consumption of equipment, a capability of the equipment, a service forwarding attribute of the equipment, synchronization stability of the equipment and the like are taken as input parameters. A retransmission resource adopts a fixed sub-frame configuration.

At this moment, the control information may be contained for forwarding, service forwarding may also be performed on a predetermined resource only, and when the control information is contained for forwarding, parameters of the control information are shown in Table 15:

TABLE 15

| Information | Description |
| --- | --- |
| Number of transmission times | 2 |
| Transmission indicator | 1 (retransmission or forwarding) |
| Resource allocation parameter | Indicating resource occupation for service transmission |
| MCS information | Indicating a modulation mode for service transmission |
| Power parameter | Indicating transmission of a power related parameter |
| MIMO information | Indicating a multi-antenna transmission mode |

The transmission indicator indicates retransmission or forwarding of the receiving equipment.

The control channel is formed according to the parameters, data of the buffer forms a packet according to a requirement of the control channel, and Step S708 is executed by modulation and coding.

If the information is identified into important information or emergent and important information, transmission mode 1 is formed according to a scheduling result, and at this moment, the control information is shown in Table 16.

TABLE 16

| Information | Description | Information | Description |
|---|---|---|---|
| Number of transmission times | 2 | Retransmission mode | CC |
| Transmission indicator | 0 (new transmission) | Time interval | Sub-frame number corresponding to the number of retransmission times |
| Resource allocation parameter | Indicating resource occupation for service transmission | Transmission manner | 0: fixed |
| MCS information | Indicating a modulation mode for service transmission | Fixed mode | 0: resource fixed |
| Power parameter | Indicating transmission of a power related parameter | Resource frequency hopping parameter | 0 |
| MIMO information | Indicating a multi-antenna transmission mode | Shift indication | According to fixed scheduling shift (sub-frame number + 0) (PRB + 0) |

When the fixed mode is adopted for transmission, the information is retransmitted. Except that an occupied sub-frame is inconsistent, the other scheduling information is consistent with the scheduling information in the first column in Table 16, that is, the resource allocation parameter, the MCS information, the power parameter and the MIMO information are consistent. The number of transmission times may also be N according to a current resource using condition and an information classification condition.

The number of transmission times in Manner 2 is 2, and is used for indicating that equipment 1 and the other correctly receiving equipment in the group may perform second transmission on the configuration for first transmission, and equipment 1 performs second transmission. The other correctly receiving equipment may select to transmit or not to transmit, a selection principle is the equipment exertion principle, and the equipment exertion principle means that power consumption of equipment, a capability of the equipment, a service forwarding attribute of the equipment, synchronization stability of the equipment and the like are taken as input parameters. A retransmission resource adopts a fixed sub-frame configuration.

At this moment, the control information may be contained for forwarding, and only service forwarding may also be performed.

When all the receiving equipment and transmitting equipment have the same control channel forwarding right and transmit control information on the control channel acquired in a competition manner, the transmission indicator is set to be 1 (as shown in Table 17). At this moment, parameters of the control information are shown in Table 18.

TABLE 17

| Transmission indicator | 1 (retransmission or forwarding) |
|---|---|

TABLE 18

| Information | Description | Information | Description |
|---|---|---|---|
| Number of transmission times | 4 | Retransmission mode | CC, IR and the like |
| Transmission indicator | Indicating new transmission and retransmission | Time interval | Sub-frame number corresponding to the number of retransmission times |
| Resource allocation parameter | Indicating resource occupation for service transmission | Transmission manner | 0: fixed |
| MCS information | Indicating a modulation mode for service transmission | Resource frequency hopping parameter | 0 |
| Power parameter | Indicating transmission of a power related parameter | Shift indication | According to fixed scheduling shift (sub-frame number + shift1) (PRB + shift2) |
| MIMO information | Indicating a multi-antenna transmission mode | | |

When the fixed mode is adopted for transmission, the information is retransmitted. Except that the occupied sub-frame is inconsistent, the other scheduling information except the resource allocation parameter is consistent with the scheduling information in the first column in Table 18, that is, the MCS information, the power parameter and the MIMO information are consistent with those indicated in the first column in Table 18. The number of transmission times may also be 2~N (N is a natural number), and indicates 4 for description about the frequency chopping manner in the embodiment, wherein a frequency hopping mode indicated by the resource frequency hopping parameter may adopt an original fixed resource indication shift manner: resource indication+shift mode. That is, the frequency hopping mode is 0, and the retransmission mode refers to scheduling according to the frequency-domain and time-domain shifts of the resource indication.

Shift indication is used for judging whether a resource with a shift is idle or not and reduce collision with a shift mode according to read control information or control header of the other channel.

Transmission mode 2 is formed according to the scheduling result. Control information under mode 2 is shown in Table 19.

implements transmission according to an available scheduled sub-frame configured by the system, and also supports inter-frame operation.

Step S708: competition-based transmission is performed on the idle resource. According to the four manners in Step S706, there are three manners for competition-based transmission.

Manner 1: due to existence of the control header, the control header is read, the idle channel is identified, the control channel and the broadcast channel are transmitted in a random selection manner according to scheduling on the idle channel, service transmission is performed according to whether the system adopts the manner that the broadcast channel and the broadcast control channel are separated or the manner that the broadcast channel and the broadcast control channel are multiplexed, and the remaining broadcast channel which has yet not been scheduled and has a retransmitted part is marked in the next control header.

For the mode that the control channel and the service channel are separated, there may exist the control channel only in first transmission, the control channel includes a control mode for transmitting first-transmitted information and all retransmitted information at this moment, such as the scheduling information in Step S704, as shown in FIG. 7, the

TABLE 19

| Information | Description | Information | Description |
| --- | --- | --- | --- |
| Number of transmission times | 2 | Retransmission mode | CC, IR and the like |
| Transmission indicator | Indicating new transmission and transmission | Time interval | Sub-frame number corresponding to the number of retransmission times |
| Resource allocation parameter | Indicating resource occupation for service transmission | Transmission manner | 1: adaptive |
| MCS information | Indicating a modulation mode for service transmission | Transmission indicator | 1 (first retransmission) |
| Power parameter | Indicating transmission of a power related parameter | Resource allocation parameter | Indicating resource occupation for serving transmission |
| MIMO information | Indicating a multi-antenna transmission mode | MCS information | Indicating a modulation mode for service transmission |
| Group ID | Indicating a group | Power parameter | Indicating transmission of a power related parameter |
| | | MIMO information | Indicating a multi-antenna transmission mode |

If the number of transmission times is N (N is a natural number), an added field in the left scheduling information which is transmitted is determined according to information timeliness during transmission of N times.

The above examples are only described for the condition of 1 bit information, and another classification method is configured to construct information related to the transmission mode parameter, the number of transmission times, the MCS information, the retransmission mode and the like only as a parameter of the scheduling information.

The embodiment only lists a transmission process in one frame, and a system may work in Time Division Duplex (TTD) and Frequency Division Duplex (FDD) modes during practical operation, so that practical transmission scheduling first transmission control information indicates some necessary decoded contents of the retransmitted service information such as the retransmission mode, the MCS, power and whether forwarding of the receiving equipment is required or not, the control information may also be transmitted at first in each service transmission sub-frame and then the service information is transmitted, and at this moment, the control header is required to indicate resource occupation of the control channel as well as resource occupation of the service channel, which causes relatively higher overhead.

Figure 11:
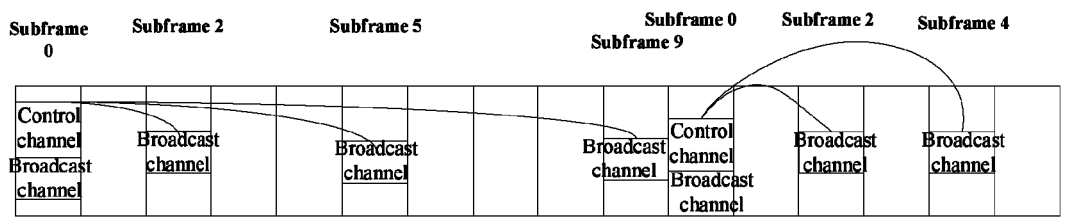
FIG. 11 is a diagram of frame indication in a case that the control channel is multiplexed according to an embodiment of the present disclosure.

For the mode that the control channel and the service channel are multiplexed, the control channel may be multiplexed during first transmission, as shown in FIG. 11, the control channel includes the control mode for transmitting the first-transmitted information and all the retransmitted information at this moment, the first transmission control information indicates some necessary decoded contents of the retransmitted service information such as the retransmission mode, the MCS, the power and whether forwarding of the receiving equipment is required or not, and the retransmitted control information may also not be transmitted during first transmission. The control channel is multiplexed during each retransmission.

Manner 2: a transmission manner that the control channel and the service channel are independent.

Resource occupation of the control channel and the service channel forms a certain binding relationship, that is, if the control channel is acquired in the competition manner, resources of the corresponding first transmission service channel may also be successfully acquired in the competition manner, and the retransmission resources do not participate in competition and are preferably occupied, that is, the receiver knows an occupation condition of the left retransmission resources and may not perform transmission on the occupied resources after decoding the control information.

Manner 3: a transmission manner that the control channel and the service channel are multiplexed.

The control channel and the service channel are transmitted together, the control channel may transmit repeated resource occupation information during first transmission, and during retransmission, the control channel may be bound, and the service channel may also be independently transmitted. That is, the receiver knows the occupation condition of the left retransmission resources and may not perform transmission on the occupied resources after decoding the control information.

Step S710: correctly receiving UE performs forwarding.

The correctly receiving equipment may select to forward according to own power capability, and the UE level, the service attribute to be forwarded and the like are forwarded according to an exertion forwarding principle. In case of first correct reception, if the CC mode is adopted, forwarding is performed on retransmission resources, i.e. sub-frames 2, 5 and 9, according to a manner indicated by the control channel, the forwarded information is the received coded information and the forwarding equipment is not recoded.

Figure 8:
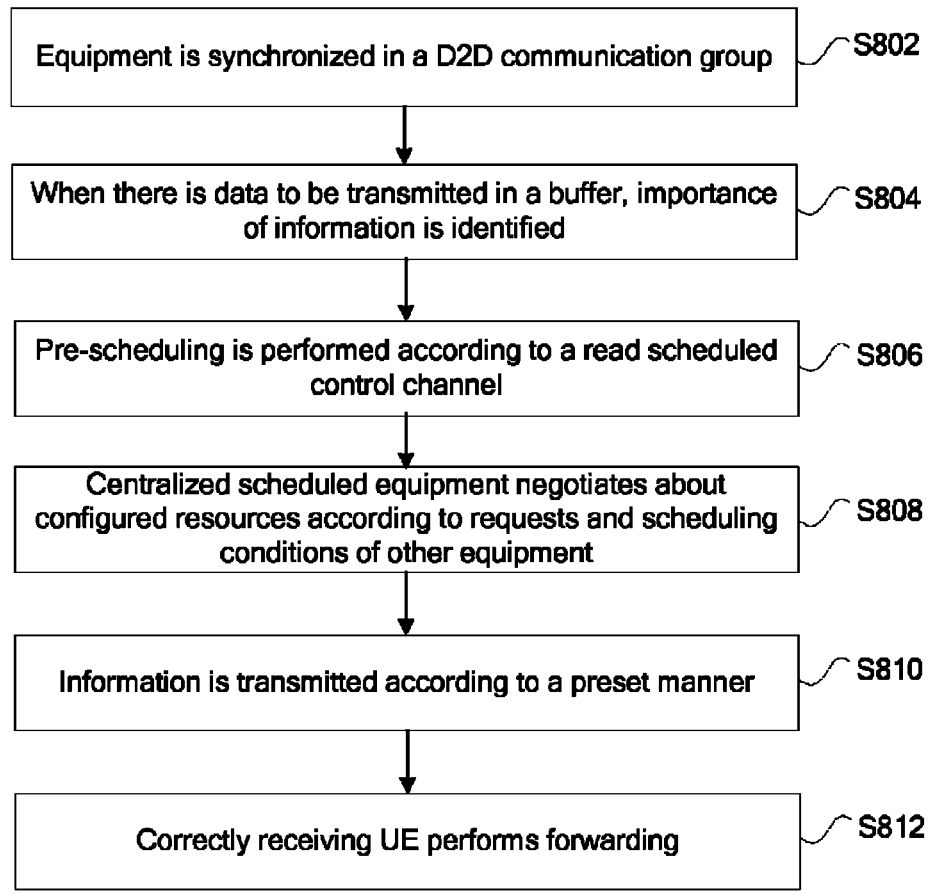
FIG. 8 is a flowchart of scheduling-based transmission according to an embodiment of the present disclosure.

FIG. 8 shows a scheduling-based transmission flow, specifically as follows.

Step S802: equipment is synchronized in a D2D communication group.

Step S804: when there is data to be transmitted in a buffer, importance of the information is identified.

Classification may be implemented by virtue of 1~3 bit according to information importance configured by a system, and the information may be classified into ordinary information, important information and important and emergent information according to information types.

Step S806: pre-scheduling is performed according to a read scheduled control channel, a pre-scheduling information content including:

ordinary information:

TABLE 20

Control Information of Manner 1

| Information | Description |
| --- | --- |
| Number of transmission times | 1 |
| Transmission indicator | 0 (new transmission) |
| Resource allocation parameter | Indicating resource occupation for service transmission |
| MCS information | Indicating a modulation mode for service transmission |
| Power parameter | Indicating transmission of a power related parameter |
| MIMO information | Indicating a multi-antenna transmission mode | or

TABLE 21

Control Information of Manner 2

| Information | Description |
| --- | --- |
| Number of transmission times | 2 |
| Transmission indicator | 0 (new transmission) |
| Resource allocation parameter | Indicating resource occupation for service transmission |
| MCS information | Indicating a modulation mode for service transmission |
| Power parameter | Indicating transmission of a power related parameter |
| MIMO information | Indicating a multi-antenna transmission mode | important information as shown in Table 22:

TABLE 22

| Information | Description | Information | Description |
| --- | --- | --- | --- |
| Number of transmission times | 2 | Retransmission mode | CC |
| Transmission indicator | 0 (new transmission) | Time interval | Sub-frame number corresponding to the number of retransmission times |
| Resource allocation parameter | Indicating resource occupation for service transmission | Transmission manner | 0: fixed |
| MCS information | Indicating a modulation mode for service transmission | Fixed mode | 0: resource fixed |
| Power parameter | Indicating transmission of a power related parameter | Resource frequency hopping parameter | 0 |

TABLE 22-continued

| Information | Description | Information | Description |
|---|---|---|---|
| MIMO information | Indicating a multi-antenna transmission mode | Shift indication | According to fixed scheduling shift (sub-frame number + 0) (PRB + 0) | important and emergent information shown in Table 23:

TABLE 23

| Information | Description | Information | Description |
|---|---|---|---|
| Number of transmission times | 4 | Retransmission mode | CC, IR and the like |
| Transmission indicator | Indicating new transmission and retransmission | Time interval | Sub-frame number corresponding to the number of retransmission times |
| Resource allocation parameter | Indicating resource occupation for service transmission | Transmission manner | 0: fixed |
| MCS information | Indicating a modulation mode for service transmission | Resource frequency hopping parameter | 0 |
| Power parameter | Indicating transmission of a power related parameter | Shift indication | According to fixed scheduling shift (sub-frame number + shift1) (PRB + shift2) |
| MIMO information | Indicating a multi-antenna transmission mode | | |

Figure 9:
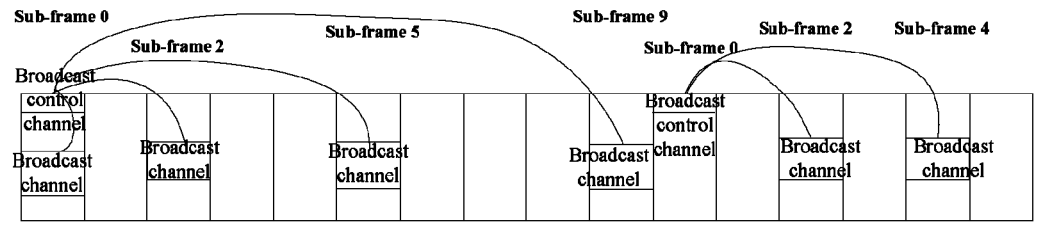
FIG. 9 is a diagram of location of a control channel and a service channel in the same frame according to an embodiment of the present disclosure.
Figure 10:
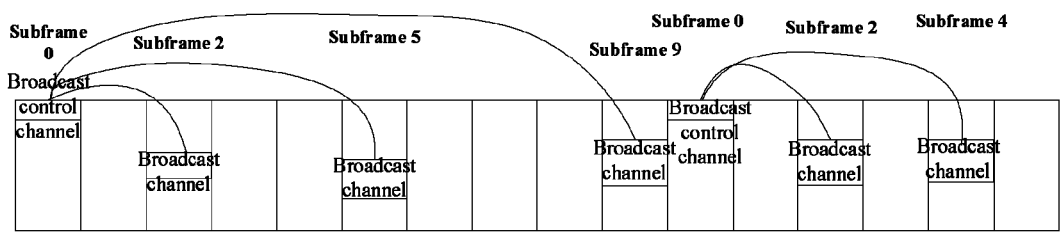
FIG. 10 is a diagram of location of a control channel and a service channel in different frames according to an embodiment of the present disclosure.

In sub-frames 0, 2, 5 and 9 shown in FIG. 9-10, the embodiment only lists a transmission process in one frame, and the system may work in TTD and FDD modes during practical operation, so that practical transmission scheduling implements transmission according to an available sub-frame configured by the system.

Requests, for example, of transmission in sub-frame 0 for the first time and transmission in sub-frames 2, 5 and 9 during retransmission, are made according to pre-configured resources.

Step S808: centralized scheduled equipment negotiates about the configured resources according to the requests and scheduling conditions of the other equipment.

If a required sub-frame has an idle resource, a position number of the idle resource is transmitted to equipment 1, and if there exists a resource conflict, the centralized scheduled equipment allocates a sub-frame resource for transmission, and then transmits the negotiated resource to equipment 1.

Step S810: information is transmitted according to a preset manner.

Manner 1: a manner that the control channel and the service channel are separated.

Some necessary decoded contents of service information such as a retransmission mode, an MCS, power and whether forwarding of receiving equipment is required or not are transmitted in the control channel.

The service information is transmitted on a resource specified by the control channel, as shown in FIG. 9-10.

The control channel may be transmitted only once in a new transmission mode, and may also be transmitted in a retransmission mode.

If the control channel is transmitted only once in the new transmission mode, the control channel is required to include retransmission-related information. Otherwise, only the related control information of first-transmitted information is transmitted, and repeated control information and a retransmission indication are transmitted in the retransmission mode.

Manner 2: a manner that the control channel and the service channel are multiplexed.

The control channel and the service channel are transmitted together, some necessary decoded contents of the service information such as the retransmission mode, the MCS, the power and whether forwarding of the receiving equipment is required or not are transmitted in the control channel. The control channel may be transmitted only once in the new transmission mode, and may also be transmitted in the retransmission mode.

If the control channel is transmitted only once in the new transmission mode, the control channel is required to include the retransmission-related information. Otherwise, only the related control information of the first-transmitted information is transmitted, and the repeated control information and the retransmission indication are transmitted in the retransmission mode.

Step S812: correctly receiving UE performs forwarding.

The correctly receiving equipment may select to forward according to own power capability, and the UE level, the service attribute to be forwarded and the like are forwarded according to the exertion forwarding principle. In case of first correct reception, if the CC mode is adopted, forwarding is performed on retransmission resources, i.e. sub-frames 2, 5 and 9, according to the manner indicated by the control channel, the forwarded information is the received coded information and the forwarding equipment is not recoded.

From the above, the embodiment of the present disclosure achieves the following beneficial effects: according to the embodiment of the present disclosure, the number of retransmission times and a retransmission method may be set according to importance of the information in a D2D feedback-free mode; the resources may be scheduled in advance on the basis of the competition manner during D2D communication, so that resource conflicts during retransmission are reduced; the resources may be scheduled in advance on the basis of the scheduling manner during D2D communication, the number of transmission times may be increased, and system reliability may be improved by reception combining; and the correctly receiving equipment may perform transmission on the resources scheduled for retransmission, and retransmission receiving correctness of equipment which wrongly receives information for the first time is improved by multi-equipment diversity.

In another embodiment, software is provided, which is configured to execute the technical solutions described in the abovementioned embodiments and preferred implementation modes.

In another embodiment, a storage medium is further provided, in which the abovementioned software is stored, the storage medium including, but not limited to: a compact disc, a floppy disk, a hard disk, an erasable memory and the like.

Obviously, those skilled in the art should know that each module or step of the present disclosure may be implemented by a universal computing device, and the modules or steps may be concentrated on a single computing device or distributed on a network formed by a plurality of computing devices, and may optionally be implemented by programmable codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

According to the technical solutions provided by the present disclosure, the technical means of acquiring the corresponding control information according to the classification information of the service information to be transmitted and broadcasting the control information and the service information according to the preset rule is adopted, so that the technical problems that there is yet no effective solution to how to improve broadcast reliability under the condition of no network coverage and the like in the related technology are solved, broadcast reliability is further improved, and system throughput is further improved.

What is claimed is:

1. A method for transmitting Device-to-Device (D2D) broadcast information, comprising:
   acquiring classification information of service information to be transmitted;
   acquiring control information corresponding to the classification information, wherein the control information is used for indicating resource scheduling information used during transmission and/or retransmission of the service information; and
   transmitting the service information and the control information in a broadcast manner according to a preset rule; and
   the control information comprises: first control information for first transmission of the service information; and second control information for retransmission of the service information.

2. The method as claimed in claim 1, wherein the classification information comprises:
   a priority of the service information and/or an importance degree of the service information to be transmitted.

3. The method as claimed in claim 2, wherein according to a priority of the service information and/or an importance degree of the service information to be transmitted, the service information may be classified into four levels, the classification information comprises:
   the first level information, the second level information, the third level information and the forth level information.

4. The method as claimed in claim 1, wherein the classification information is indicated by a bit value of a preset number of bits.

5. The method as claimed in claim 1, wherein transmitting the service information and the control information in the broadcast manner according to the preset rule comprises at least one of:
   when the service information is transmitted for the first time, transmitting the control information; and
   when the service information is retransmitted, forbidding retransmission of the control information, or, retransmitting a part or all of the control information.

6. The method as claimed in claim 1, wherein acquiring the classification information of the service information to be transmitted comprises one of:
   acquiring the classification information from high-layer signaling; and
   acquiring the classification information from specified key press information of specified equipment.

7. The method as claimed in claim 1, wherein acquiring the control information corresponding to the classification information comprises:
   acquiring the control information according to the classification information and a cache size of the service information on the basis of a monitored condition of available idle channels during competition or on the basis of a resource occupation condition during scheduling.

8. The method as claimed in claim 1, wherein the control information at least comprises:
   the number of transmission times of the service information, a transmission indicator used for indicating that the service information is newly transmitted information, retransmitted information or forwarded information, and a resource allocation parameter used for indicating an occupation condition of resources for transmitting the service information, wherein the newly transmitted information is service information which has yet not been transmitted before the service information is transmitted and is different from the service information.

9. The method as claimed in claim 8, wherein, when a service corresponding to the service information is a constant service, the control information further at least comprises: resource scheduling information adopted when the constant service is transmitted in multiple transmissions.

10. The method as claimed in claim 8, wherein the control information further comprises at least one of:
a retransmission mode, a transmission manner for the service information, Modulation and Coding Scheme (MCS) information used for indicating a modulation mode of the service information, a power parameter used for indicating transmission power of the service information, Multiple Input Multiple Output (MIMO) information used for indicating an antenna transmission mode, a fixed mode used for indicating a shift in a time domain or a frequency domain, a resource frequency hopping parameter used for indicating pattern selection and an adaptive parameter used for selecting a corresponding configuration parameter according to the transmission manner.

11. The method as claimed in claim 1, wherein, when the service information is retransmitted, and when a frequency-domain position occupied by retransmission of the service information is the same as a frequency-domain position occupied by first transmission of the service information, a sub-frame for transmitting the service information is configured in a time domain as follows:
p+n×shift, where p represents a sub-frame number during the first transmission of the service information; n represents the number of transmission times of the service information; and shift represents a shift, which is a constant.

12. The method as claimed in claim 1, wherein, when the service information and the control information are transmitted, a service channel bearing the service information and a control channel bearing the control information are multiplexed or separated.

13. A method for receiving Device-to-Device (D2D) broadcast information, comprising:
receiving service information and control information from transmitting equipment, wherein the control information corresponds to classification information of the service information;
analyzing the service information according to the control information corresponding to the classification information, and judging whether to assist in transmitting the service information or not according to a specified parameter obtained by analyzing the service information and a current state of receiving equipment; and
forwarding the service information under a condition of judging to assist in transmitting the service information; and
the control information comprises: first control information for first transmission of the service information; and second control information for retransmission of the service information.

14. The method as claimed in claim 13, before judging whether to assist in transmitting the service information or not according to the classification information of the service information and the current state of the receiving equipment, the method comprising:
judging whether the service information is correctly received or not, wherein whether to assist in transmitting the service information or not is judged under a condition that the service information is correctly received.

15. The method as claimed in claim 14, further comprising:
judging whether the service information has retransmitted information or not according to the control information under a condition that the service information is wrongly received, and when the service information has retransmitted information, reserving the service information to be transmitted;
receiving the retransmitted information of the service information; and
combining the received retransmitted information of the service information and the reserved service information.

16. The method as claimed in claim 13, wherein
the current state of the receiving equipment comprises at least one of: a power capability of the receiving equipment and a level of the receiving equipment; and/or
the specified parameter comprises at least one of: the classification information of the service information and resource scheduling information of the service information.

17. A device for transmitting Device-to-Device (D2D) broadcast information, comprising a hardware processor configured to execute program units stored on a memory, wherein the program units comprising:
a first acquisition module, configured to acquire classification information of service information to be transmitted;
a second acquisition module, configured to acquire control information corresponding to the classification information, wherein the control information is used for indicating resource scheduling information used during transmission and/or retransmission of the service information; and
a transmission module, configured to transmit the service information and the control information in a broadcast manner according to a preset rule; and
the control information comprises: first control information for first transmission of the service information; and second control information for retransmission of the service information.

18. A User Equipment, comprising a hardware processor configured to execute program units stored on a memory, wherein the program units comprising:
a receiving module, configured to receive service information and control information from transmitting equipment, wherein the control information is used for indicating resource scheduling information used during transmission and/or retransmission of the service information, and the control information corresponds to classification information of the service information;
an analysis module, configured to analyze the service information according to the control information corresponding to the classification information;
a judgment module, configured to judge whether to assist in transmitting the service information or not according to a specified parameter obtained by analyzing the service information and a current state of receiving equipment; and
a forwarding module, configured to forward the service information under a condition that the judgment module judges to assist in transmitting the service information; and
the control information comprises: first control information for first transmission of the service information; and second control information for retransmission of the service information.

* * * * *